United States Patent
Hertzberg et al.

(10) Patent No.: US 12,081,943 B2
(45) Date of Patent: Sep. 3, 2024

(54) BEAMFORMING DEVICES FOR HEARING ASSISTANCE

(71) Applicant: NUANCE HEARING LTD., Tel Aviv (IL)

(72) Inventors: Yehonatan Hertzberg, Shoham (IL); Oran Bertelsen, Ramat Gan (IL); Omer Kotzer, Tel Aviv (IL); Igor Gitelstain, Rehovot (IL); Ori Goren, Shoham (IL); Stanislav Berlin, Kiryat Ono (IL)

(73) Assignee: NUANCE HEARING LTD., Tel Aviv (IL)

( * ) Notice: Subject to any disclaimer, the term of this patent is extended or adjusted under 35 U.S.C. 154(b) by 117 days.

(21) Appl. No.: 17/766,736

(22) PCT Filed: Oct. 14, 2020

(86) PCT No.: PCT/IB2020/059654
§ 371 (c)(1),
(2) Date: Apr. 6, 2022

(87) PCT Pub. No.: WO2021/074818
PCT Pub. Date: Apr. 22, 2021

(65) Prior Publication Data
US 2023/0336926 A1    Oct. 19, 2023

Related U.S. Application Data

(60) Provisional application No. 62/915,660, filed on Oct. 16, 2019, provisional application No. 63/003,930, filed on Apr. 2, 2020.

(51) Int. Cl.
*H04R 25/00*    (2006.01)

(52) U.S. Cl.
CPC .......... *H04R 25/407* (2013.01); *H04R 25/405* (2013.01); *H04R 2460/01* (2013.01)

(58) Field of Classification Search
CPC . H04R 25/407; H04R 25/425; H04R 2460/01
See application file for complete search history.

(56) References Cited

U.S. PATENT DOCUMENTS

| 3,119,903 A | | 1/1964 | Rosemond et al. |
| 4,904,078 A | * | 2/1990 | Gorike ................. H04R 25/552 381/313 |

(Continued)

FOREIGN PATENT DOCUMENTS

| CN | 205608327 U | 9/2016 |
| CN | 206115061 U | 4/2017 |

(Continued)

OTHER PUBLICATIONS

EP Application # 20877167.5 Extended Search Report dated Dec. 4, 2023.

(Continued)

*Primary Examiner* — Sunita Joshi
(74) *Attorney, Agent, or Firm* — MEITAR PATENTS LTD.

(57) ABSTRACT

Apparatus (20) for hearing assistance includes a spectacle frame (22), including a front piece (30) and temples (32), with one or more microphones (23) mounted at respective first locations on the front piece and configured to output electrical signals in response to first acoustic waves (64) that are incident on the microphones. A speaker (28) is mounted at a second location on one of the temples outputs second acoustic waves (66). Processing circuitry (26) generates a drive signal for the speaker by processing the electrical signals output by the microphones so as to cause the speaker to reproduce selected sounds occurring in the first acoustic waves with a delay that is equal within 20% to a transit time (Continued)

of the first acoustic waves from the first location to the second location, thereby engendering constructive interference between the first and second acoustic waves.

24 Claims, 4 Drawing Sheets

(56) References Cited

U.S. PATENT DOCUMENTS

| | | | |
|---|---|---|---|
| 5,263,089 A | 11/1993 | Ribic | |
| 5,793,875 A | 8/1998 | Lehr et al. | |
| 6,289,327 B1 | 9/2001 | Woodsum et al. | |
| 6,434,539 B1 | 8/2002 | Woodsum et al. | |
| 7,031,483 B2 | 4/2006 | Boone et al. | |
| 7,092,690 B2 | 8/2006 | Zancewicz | |
| 7,099,486 B2 | 8/2006 | Julstrom et al. | |
| 7,103,192 B2 | 9/2006 | Bailey | |
| 7,369,669 B2 | 5/2008 | Hagen et al. | |
| 7,369,671 B2 | 5/2008 | Sacha | |
| 7,542,580 B2 | 6/2009 | Burns | |
| 7,609,842 B2 | 10/2009 | Sipkema et al. | |
| 7,735,996 B2 | 6/2010 | Van Der Zwan et al. | |
| 7,809,149 B2 | 10/2010 | Burns | |
| 7,822,217 B2 | 10/2010 | Hagen et al. | |
| 8,116,493 B2 | 2/2012 | Westermann | |
| 8,139,801 B2 | 3/2012 | Sipkema et al. | |
| 8,494,193 B2 | 7/2013 | Zhang et al. | |
| 8,611,554 B2 | 12/2013 | Short et al. | |
| 8,744,101 B1 | 6/2014 | Burns | |
| 9,113,245 B2 | 8/2015 | Gelhard | |
| 9,282,392 B2 | 3/2016 | Ushakov | |
| 9,288,589 B2 | 3/2016 | Cheung | |
| 9,392,381 B1 | 7/2016 | Park et al. | |
| 9,591,410 B2 | 3/2017 | Short et al. | |
| 9,635,474 B2 | 4/2017 | Kuster | |
| 9,641,942 B2 | 5/2017 | Strelcyk et al. | |
| 9,753,311 B2 | 9/2017 | Fan | |
| 9,763,016 B2 | 9/2017 | Merks et al. | |
| 9,810,925 B2 | 9/2017 | Fan | |
| 9,781,523 B2 | 10/2017 | Kuster et al. | |
| 9,812,116 B2 | 11/2017 | Ushakov | |
| 9,832,576 B2 | 11/2017 | Jensen et al. | |
| 9,980,054 B2 | 5/2018 | McCracken | |
| 10,056,091 B2 | 8/2018 | Orescanin et al. | |
| 10,102,850 B1 | 10/2018 | Basye et al. | |
| 10,225,670 B2 | 3/2019 | Feilner et al. | |
| 10,231,065 B2 | 3/2019 | Udesen | |
| 10,353,221 B1 | 7/2019 | Graff et al. | |
| 10,379,386 B2 | 8/2019 | Fan | |
| D865,040 S | 10/2019 | Schaal et al. | |
| D874,008 S | 1/2020 | Kotzer et al. | |
| 10,567,888 B2 | 2/2020 | Hertzberg et al. | |
| 10,582,295 B1 | 3/2020 | Zhong et al. | |
| 10,721,572 B2 | 7/2020 | Petersen et al. | |
| 10,805,739 B2 | 10/2020 | Sjursen | |
| 10,820,121 B2 | 10/2020 | Lunner et al. | |
| 11,259,127 B2 | 2/2022 | De Haan et al. | |
| 11,363,389 B2 | 6/2022 | Pedersen et al. | |
| 11,510,019 B2 | 11/2022 | Rohde et al. | |
| 11,521,633 B2 | 12/2022 | Liu | |
| 2004/0076301 A1 | 4/2004 | Algazi et al. | |
| 2006/0013416 A1 | 1/2006 | Truong et al. | |
| 2007/0038442 A1 | 2/2007 | Visser et al. | |
| 2008/0192968 A1 | 8/2008 | Ho et al. | |
| 2009/0296044 A1* | 12/2009 | Howell | G02C 5/143 351/158 |
| 2009/0323973 A1 | 12/2009 | Dyba | |
| 2011/0091057 A1* | 4/2011 | Derkx | H04R 25/407 381/313 |
| 2011/0293129 A1 | 12/2011 | Dillen et al. | |
| 2012/0128175 A1 | 5/2012 | Visser et al. | |
| 2012/0215519 A1 | 8/2012 | Park et al. | |
| 2012/0224715 A1 | 9/2012 | Kikkeri | |
| 2014/0093091 A1 | 4/2014 | Dusan et al. | |
| 2014/0093093 A1 | 4/2014 | Dusan et al. | |
| 2014/0270316 A1 | 9/2014 | Kopina et al. | |
| 2015/0036856 A1 | 2/2015 | Pruthi et al. | |
| 2015/0049892 A1 | 2/2015 | Petersen et al. | |
| 2015/0201271 A1 | 7/2015 | Diethorn et al. | |
| 2015/0230026 A1 | 8/2015 | Eichfeld et al. | |
| 2015/0289064 A1 | 10/2015 | Jensen et al. | |
| 2016/0111113 A1 | 4/2016 | Cho et al. | |
| 2017/0272867 A1 | 9/2017 | Zisapel et al. | |
| 2018/0146285 A1 | 5/2018 | Benattar et al. | |
| 2018/0330747 A1 | 11/2018 | Ebenezer | |
| 2018/0359294 A1 | 12/2018 | Brown et al. | |
| 2019/0104370 A1 | 4/2019 | Zisapel et al. | |
| 2019/0373355 A1 | 12/2019 | Lee et al. | |
| 2020/0005770 A1 | 1/2020 | Lunner et al. | |
| 2022/0201403 A1 | 6/2022 | Khaleghimeybodi et al. | |

FOREIGN PATENT DOCUMENTS

| | | | |
|---|---|---|---|
| CN | 206920741 U | 1/2018 | |
| CN | 207037261 U | 2/2018 | |
| CN | 208314369 U | 1/2019 | |
| CN | 208351162 U | 1/2019 | |
| CN | 209693024 U | 11/2019 | |
| CN | 209803482 U | 12/2019 | |
| ES | 1213304 U | 5/2018 | |
| KR | 20130054898 A | 5/2013 | |
| KR | 101786613 B1 | 10/2017 | |
| KR | 102006414 B1 | 8/2019 | |
| WO | WO-9960822 A1 * | 11/1999 | ........... H04R 25/453 |
| WO | 2004016037 A1 | 2/2004 | |
| WO | 2013169618 A1 | 11/2013 | |
| WO | 2017158507 A1 | 9/2017 | |
| WO | 2017171137 A1 | 10/2017 | |
| WO | 2018127412 A1 | 7/2018 | |
| WO | 2018234628 A1 | 12/2018 | |
| WO | 2021014344 A1 | 1/2021 | |
| WO | 2022133086 A1 | 6/2022 | |

OTHER PUBLICATIONS

Pauline et al., "Variable tap-length non-parametric variable step-size NLMS adaptive filtering algorithm for acoustic echo cancellation," Applied Acoustics, Elsevier, vol. 159, pp. 1-10, Feb. 2020.

Spriet et al., "Feedback control in hearing aids," Springer Handbook of Speech Processing and Speech Communication (Chapter 48, Part H.—Speech Enhancement; Benesty et al., eds.), Springer, pp. 1-29, year 2007.

Hoydal, "A New Own Voice Processing System for Optimizing Communication," The Hearing Review, pp. 1-8, Nov. 2017, as downloaded from https://hearingreview.com/practice-building/marketing/new-voice-processing-system-optimizing-communication.

Wikipedia, "Least Mean Squares Filter," pp. 1-6, last edited Jul. 23, 2019.

Camacho et al., "Phase Coherence Imaging: Principles, applications and current developments," POMA—Proceedings of Meetings on Acoustics, 2019 International Congress on Ultrasonics, Signal Processing in Acoustics: PSP (2/3) Presentation 1, pp. 1-7, year 2019.

Widrow et al., "Microphone Arrays for Hearing Aids: An Overview", Speech Communication, vol. 39, pp. 139-146, year 2003.

Bose Hearphones™, "Hear Better", pp. 1-3, Feb. 19, 2017.

Veen et al., "Beamforming Techniques for Spatial Filtering", CRC Press, pp. 1-23, year 1999.

"iCE40 Series MobileFPGA Family," Product Information, Lattice Semiconductor, Santa Clara, Calif., pp. 1-2, last updated May 13, 2021, as downloaded from https://www.mouser.co.il/new/lattice-semiconductor/lattice-ice40-FPGA/.

Choi et al., "Blind Source Separation and Independent Component Analysis: A Review," Neural Information Processing—Letters and Review, vol. 6, No. 1, pp. 1-57, year 2005.

Mukai et al., "Real-Time Blind Source Separation and DOA Estimation Using Small 3-D Microphone Array," Proceedings of the International Workshop on Acoustic Echo and Noise Control (IWAENC), pp. 45-48, year 2005.

(56) References Cited

OTHER PUBLICATIONS

Huang et al., "Real-Time Passive Source Localization: A Practical Linear-Correction Least-Squares Approach," IEEE Transactions on Speech and Audio Processing, vol. 9, No. 8, pp. 943-956, year 2001.
Sawada et al., "Direction of Arrival Estimation for Multiple Source Signals Using Independent Component Analysis," IEEE Proceedings of the Seventh International Symposium on Signal Processing and its Applications, vol. 2, pp. 1-4, year 2003.
Adavanne et al., "Direction of Arrival Estimation for Multiple Sound Sources Using Convolutional Recurrent Neural Network," 26th European Signal Processing Conference (EUSIPCO), IEEE, pp. 1462-1466, year 2018.
Byrne et al., "An International Comparison of Long-Term Average Speech Spectra," The Journal of the Acoustical Society of America, vol. 96, No. 4, pp. 2108-2120, year 1994.
Wikipedia, "Direction of Arrival," pp. 1-2, last edited Nov. 15, 2020.
DiBiase, "A High-Accuracy, Low-Latency Technique for Talker Localization in Reverberant Environments Using Microphone Arrays," Doctoral Thesis, Division of Engineering, Brown University, Providence, Rhode Island, pp. 1-122, year 2000.
International Application # PCT/IB2020/059654 Search Report dated Feb. 7, 2021.
AU Application # 2020316738 Office Action dated Dec. 16, 2022.
U.S. Appl. No. 17/623,892 Office Action dated Feb. 16, 2023.
EP Application # 20844216.0 ESR dated Jun. 29, 2023.
Chen et al., "Novel Radiation Pattern by Genetic Algorithms in Wireless Communication," Proceedings of the IEEE VTS 53rd Vehicular Technology Conference, pp. 8-12, year 2001.

\* cited by examiner

BEAMFORMING DEVICES FOR HEARING ASSISTANCE

CROSS-REFERENCE TO RELATED APPLICATION

This application claims the benefit of U.S. Provisional Patent Application 62/915,660, filed Oct. 16, 2019, and U.S. Provisional Patent Application 63/003,930, filed Apr. 2, 2020, both of which are incorporated herein by reference.

FIELD OF THE INVENTION

The present invention relates generally to hearing aids, and particularly to devices and methods for improving directional hearing.

BACKGROUND

Speech understanding in noisy environments is a significant problem for the hearing-impaired. Hearing impairment is usually accompanied by a reduced time resolution of the sensorial system in addition to a gain loss. These characteristics further reduce the ability of the hearing-impaired to filter the target source from the background noise and particularly to understand speech in noisy environments.

Some newer hearing aids offer a directional hearing mode to improve speech intelligibility in noisy environments. This mode makes use of an array of microphones and applies beamforming technology to combine multiple microphone inputs into a single, directional audio output channel. The output channel has spatial characteristics that increase the contribution of acoustic waves arriving from the target direction relative to those of the acoustic waves from other directions.

For example, PCT International Publication WO 2017/158507, whose disclosure is incorporated herein by reference, describes hearing aid apparatus, including a case, which is configured to be physically fixed to a mobile telephone. An array of microphones are spaced apart within the case and are configured to produce electrical signals in response to acoustical inputs to the microphones. An interface is fixed within the case, along with processing circuitry, which is coupled to receive and process the electrical signals from the microphones so as to generate a combined signal for output via the interface.

As another example, U.S. Pat. No. 10,567,888, whose disclosure is incorporated herein by reference, describes audio apparatus, which includes a neckband, which is sized and shaped to be worn around a neck of a human subject. First and second arrays of microphones are disposed respectively on the left and right sides of the neckband, and one or more earphones are worn in the ears of the human subject. Processing circuitry is coupled to receive and mix the electrical signals from the microphones in the first and second arrays in accordance with a specified directional response relative to the neckband so as to generate a combined audio signal for output via the one or more earphones.

SUMMARY

Embodiments of the present invention that are described hereinbelow provide improved hearing aids and methods for enhancing hearing aid performance.

There is therefore provided, in accordance with an embodiment of the invention, apparatus for hearing assistance, including a spectacle frame, which includes a front piece and temples connected to respective edges of the front piece. One or more microphones are mounted at respective first locations on the front piece and configured to output electrical signals in response to first acoustic waves that are incident on the microphones. A speaker is mounted at a second location on one of the temples and configured to output second acoustic waves in response to a drive signal applied to the speaker. Processing circuitry is configured to generate the drive signal by processing the electrical signals output by the one or more microphones so as to cause the speaker to reproduce, in the second acoustic waves, selected sounds occurring in the first acoustic waves with a delay, relative to an incidence of the first acoustic waves on the one or more microphones, that is equal within 20% to a transit time of the first acoustic waves from the first location to the second location, thereby engendering constructive interference of the selected sounds between the first and second acoustic waves.

In some embodiments, the delay of the selected sounds reproduced in the second acoustic waves is equal to within 10% to the transit time of the first acoustic waves from the first location to the second location. Additionally or alternatively, the delay of the selected sounds reproduced in the second acoustic waves relative to the incidence the first acoustic waves on the one or more microphones is between 150 μs and 250 μs.

Further additionally or alternatively, the processing circuitry is configured to adjust the delay of the selected sounds reproduced in the second acoustic waves relative to the first acoustic waves from the first location to the second location. In a disclosed embodiment, the delay is selected so as to apply the constructive interference to the first acoustic waves that are incident on the one or more microphones from within a selected angular range while applying destructive interference to the first acoustic waves that are incident on the one or more microphones from directions outside the selected angular range. In one embodiment, the one or more microphones include multiple microphones arrayed across the front piece, and the processing circuitry is configured to apply a beamforming function to the electrical signals output by the multiple microphones so as to emphasize the selected sounds that originate within the selected angular range while suppressing background sounds originating outside the selected angular range.

Additionally or alternatively, the processing circuitry is configured to filter the electrical signals using a digital filter, which defines an audio feedback loop having a resonant frequency, so as to generate the drive signal for input to the speaker, and to vary the resonant frequency continually while amplifying and filtering the electrical signals.

In a disclosed embodiment, the apparatus includes first connection terminals fixed respectively to left and right edges of the front piece and second connection terminals fixed at respective front ends of the temples and configured to mate with the first connection terminals so as to connect the temples mechanically to the front piece while completing an electrical circuit connection between the one or more microphones, the processing circuitry, and the speaker.

There is also provided, in accordance with an embodiment of the invention, apparatus for hearing assistance, including one or more microphones, which are configured be mounted in proximity to a head of a subject and to output electrical signals in response to first acoustic waves that are incident on the microphones, and a speaker, which is configured for mounting in proximity to an ear of the subject. Processing circuitry is configured to amplify and filter the electrical signals so as to generate a drive signal for input to the speaker, using a digital filter that defines, together with the one or more microphones and the speakers, an audio feedback loop having a resonant frequency, and to vary the resonant frequency continually while amplifying and filtering the electrical signals.

In some embodiments, the digital filter has a temporal latency, which determines the resonant frequency, and the processing circuitry is configured to modulate the temporal latency in order to vary the resonant frequency. In a disclosed embodiment, the processing circuitry is configured to sample the electrical signals for input to the digital filter at a sequence of sampling intervals and to modulate the temporal latency of the digital filter by modifying the sampling intervals. Alternatively, the processing circuitry is configured to transform the electrical signals to a frequency domain for input to the digital filter and to modify a frequency response of the digital filter in order to vary the resonant frequency.

In some embodiments, the one or more microphones include an array of multiple microphones, and the processing circuitry is configured to apply a beamforming function to the electrical signals output by the multiple microphones so as to emphasize in the drive signal sounds that originate within a selected angular range while suppressing background sounds originating outside the selected angular range.

In a disclosed embodiment, the apparatus includes a spectacle frame, wherein the one or more microphones are mounted at respective locations on the spectacle frame.

There is additionally provided, in accordance with an embodiment of the invention, apparatus for hearing assistance, which includes a spectacle frame, including a front piece and temples, and one or more microphones mounted at respective first locations on the front piece and configured to output electrical signals in response to first acoustic waves that are incident on the microphones. A speaker is mounted at a second location on at least one of the temples and configured to output second acoustic waves in response to a drive signal applied to the speaker. Processing circuitry is mounted on the spectacle frame and is configured to process the electrical signals so as to generate the drive signal. First connection terminals are fixed respectively to left and right edges of the front piece. Second connection terminals are fixed at respective front ends of the temples and configured to mate with the first connection terminals so as to connect the temples mechanically to the front piece while completing an electrical circuit connection between the one or more microphones, the processing circuitry, and the speaker.

Typically, the one or more microphones include multiple microphones arrayed across the front piece, and the processing circuitry is configured to apply a beamforming function to the electrical signals output by the multiple microphones so as to emphasize in the drive signal sounds that originate within a selected angular range while suppressing background sounds originating outside the selected angular range.

Additionally or alternatively, the temples are selected from a set of interchangeable temples, including first temples having first speakers configured for insertion into an ear of a user of the apparatus and second temples having second speakers configured to be positioned outside the ear of the user.

There is further provided, in accordance with an embodiment of the invention, a method for hearing assistance, which includes mounting on a front piece of a spectacle frame one or more microphones, which output electrical signals in response to first acoustic waves that are incident on the microphones. A speaker is mounted on at least one of the temples of the spectacle frame, which are connected to respective edges of the front piece, and outputs second acoustic waves in response to a drive signal applied to the speaker. The drive signal is generated by processing the electrical signals output by the one or more microphones so as to cause the speaker to reproduce, in the second acoustic waves, selected sounds occurring in the first acoustic waves with a delay, relative to an incidence of the first acoustic waves on the one or more microphones, that is equal within 20% to a transit time of the first acoustic waves from the first location to the second location, thereby engendering constructive interference of the selected sounds between the first and second acoustic waves.

There is moreover provided, in accordance with an embodiment of the invention, a method for hearing assistance, which includes mounting in proximity to a head of a subject one or more microphones, which output electrical signals in response to first acoustic waves that are incident on the microphones. A speaker is mounted in proximity to an ear of the subject. The electrical signals are amplified and filtered so as to generate a drive signal for input to the speaker, using a digital filter that defines, together with the one or more microphones and the speakers, an audio feedback loop having a resonant frequency. The resonant frequency is varied continually while amplifying and filtering the electrical signals.

The present invention will be more fully understood from the following detailed description of the embodiments thereof, taken together with the drawings in which:

DETAILED DESCRIPTION OF EMBODIMENTS

Overview

Figure 1:
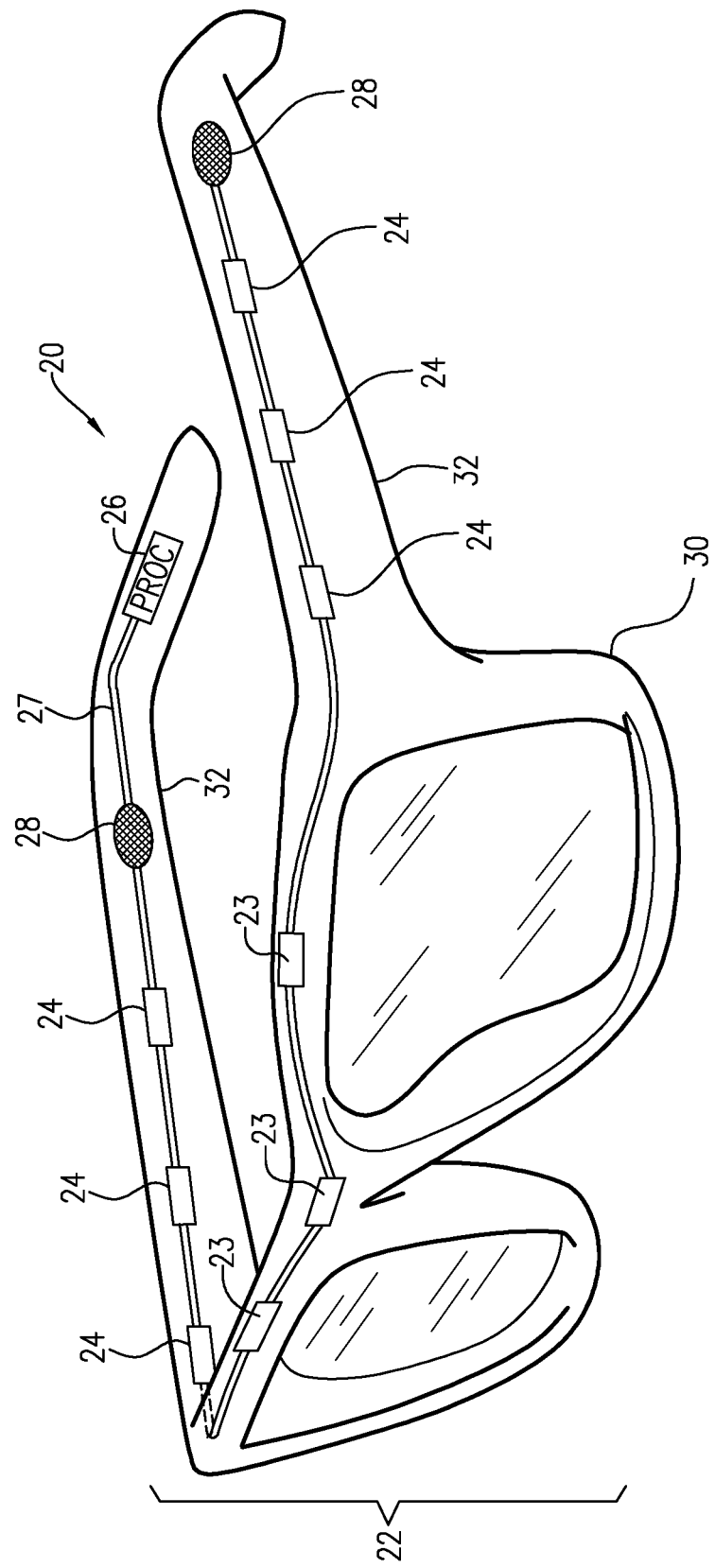
FIG. 1 is a schematic pictorial illustration showing a hearing assistance device based on a spectacle frame, in accordance with an embodiment of the invention.

Despite the need for directional hearing assistance and the theoretical benefits of microphone arrays in this regard, in practice the directional performance of hearing aids falls far short of that achieved by natural hearing. In general, good directional hearing assistance requires a relatively large number of microphones, spaced well apart, in a design that is both unobtrusive and enables the user to aim the directional response of the hearing aid easily toward a point of interest, such as toward a conversation partner in noisy environment. The processing circuitry that processes the signals output by the microphones in order to generate the audio output for the user should reproduce the natural hearing experience as nearly as possible while minimizing bothersome artifacts.

One of these artifacts is the strong whistle that can arise due to acoustic feedback from the audio output of the speaker to the input of the microphones. Such whistling arises when the acoustic feedback gain of the hearing aid at a given frequency is greater than a certain threshold. Conventional solutions to this problem include reducing the gain of the hearing aid and filtering the range of audio frequencies at which the feedback arises; but these solutions also reduce the effectiveness of the hearing aid in amplifying faint and high-pitched sounds. It is also possible to reduce the feedback gain mechanically by fitting an ear mold to the user's ear, but many users find this solution uncomfortable and unsightly.

Feedback whistling arises because the processing circuitry that is used to generate the audio output inherently defines, together with the one or more microphones and the speakers, an audio feedback loop; and this loop has a resonant frequency, for example due to the temporal latency of a digital filter in the processing circuitry. Embodiments of the present invention address the source of this problem in a novel way, by varying the resonant frequency continually while the processing circuitry amplifies and filters the electrical signals. The variation is large enough and rapid enough to prevent the feedback at any given frequency from building up to an audible level. The modulation of the filter characteristics, however, is imperceptible to the user of the hearing assistance device.

As noted earlier, for reasons of comfort and aesthetic appearance, many users of hearing aids prefer not to have speakers fitted into and/or over their ears, leading to a need for "ear-free" hearing assistance devices. In response to this preference, in some embodiments of the present invention, a hearing assistance device is built into a spectacle frame. In this configuration, a microphone or an array of microphones are mounted at respective locations on the front piece of the spectacle frame, and possibly along the temples of the frame, as well. Processing circuitry receives the electrical signals output by the microphones in response to the incident acoustic waves, and processes these signals to generate a drive signal to drive a speaker or speakers mounted on one or both of the temples. The techniques for feedback suppression that were described above may be advantageously implemented in such a spectacle-based device.

In some of these spectacle-based embodiments, the speaker is mounted on the temple at a location near the ear, but is not configured for insertion into the ear for reasons of user comfort and aesthetic appearance. In this case, the user will hear a combination of the actual sounds reaching his or her ear from the environment and the amplified and filtered sounds that are output by the speaker. To enhance the user's listening experience, the processing circuitry generates the drive signal to the speaker with a delay chosen so as to generate constructive interference with the sounds coming from the environment, and thus to enhance the clarity of sounds coming from a selected direction.

Specifically, the drive signal is generated so as to cause the speaker to reproduce selected sounds with a delay, relative to the incidence of the corresponding acoustic waves on the microphones, that is approximately equal to the transit time of the acoustic waves from the front piece of the frames to the speaker location. ("Approximately equal" in this context means that the delay of the sounds output by the speaker is typically within 10-20% of the transit time of the acoustic waves from the front piece to the speaker.) Thus, sounds from the environment and the corresponding sounds output by the speaker will reach the user's ear at roughly the same time. Constructive interference between the acoustic waves from the environment and those from the speaker improves the directionality of hearing, emphasizing sounds that originate within a certain, selected angular range, while destructive interference outside this angular range suppresses background sounds.

System Description

FIG. 1 is a schematic pictorial illustration of a hearing assistance device 20 that is integrated into a spectacle frame 22, in accordance with another embodiment of the invention. An array of microphones 23, 24 are mounted at respective locations on spectacle frame 22 and output electrical signals in response to acoustic waves that are incident on the microphones. In the pictured example, microphones 23 are mounted on a front piece 30 of frame 22, while microphones 24 are mounted on temples 32, which are connected to respective edges of front piece 30. Although the extensive array of microphones 23 and 24 that is shown in FIG. 1 is useful in some applications of the present invention, the principles of signal processing and hearing assistance that are described herein may alternatively be applied, mutatis mutandis, using smaller numbers of microphones. For example, these principles may be applied using an array of microphones 23 or even, in some embodiments, a single microphone on front piece 30, as well as in devices using other microphone mounting arrangements.

Processing circuitry 26 is fixed within or otherwise connected to spectacle frame 22 and is coupled by electrical wiring 27, such as traces on a flexible printed circuit, to receive the electrical signals output from microphones 23, 24. Although processing circuitry 26 is shown in FIG. 1, for the sake of simplicity, at a certain location in temple 32, some or all of the processing circuitry may alternatively be located in front piece 30 or in a unit connected externally to frame 22. Processing circuitry 26 mixes the signals from the microphones so as to generate an audio output with a certain directional response, for example by applying a beamforming function so as to emphasize the sounds that originate within a selected angular range while suppressing background sounds originating outside this range. Typically, although not necessarily, the directional response is aligned with the angular orientation of frame 22. The signal processing functions of circuitry 26 are described in greater detail hereinbelow.

Processing circuitry 26 may convey the audio output to the user's ear via any suitable sort of interface and speaker. In the pictured embodiment, the audio output has the form of a drive signal for driving one or more audio speakers 28, which are mounted on temples 32, typically in proximity to the user's ears. Although only a single speaker 28 is shown on each temple 32 in FIG. 1, device 20 may alternatively comprise two or more speakers mounted on one or both of temples 32. In this case, processing circuitry 26 may apply a beamforming function in the drive signals so as to direct the acoustic waves from the speakers toward the user's ears. Alternatively, the drive signals may be conveyed to speakers that are inserted into the ears or may be transmitted over a wireless connection, for example as a magnetic signal, to a telecoil in a hearing aid (not shown) of a user who is wearing the spectacle frame.

Figure 2:
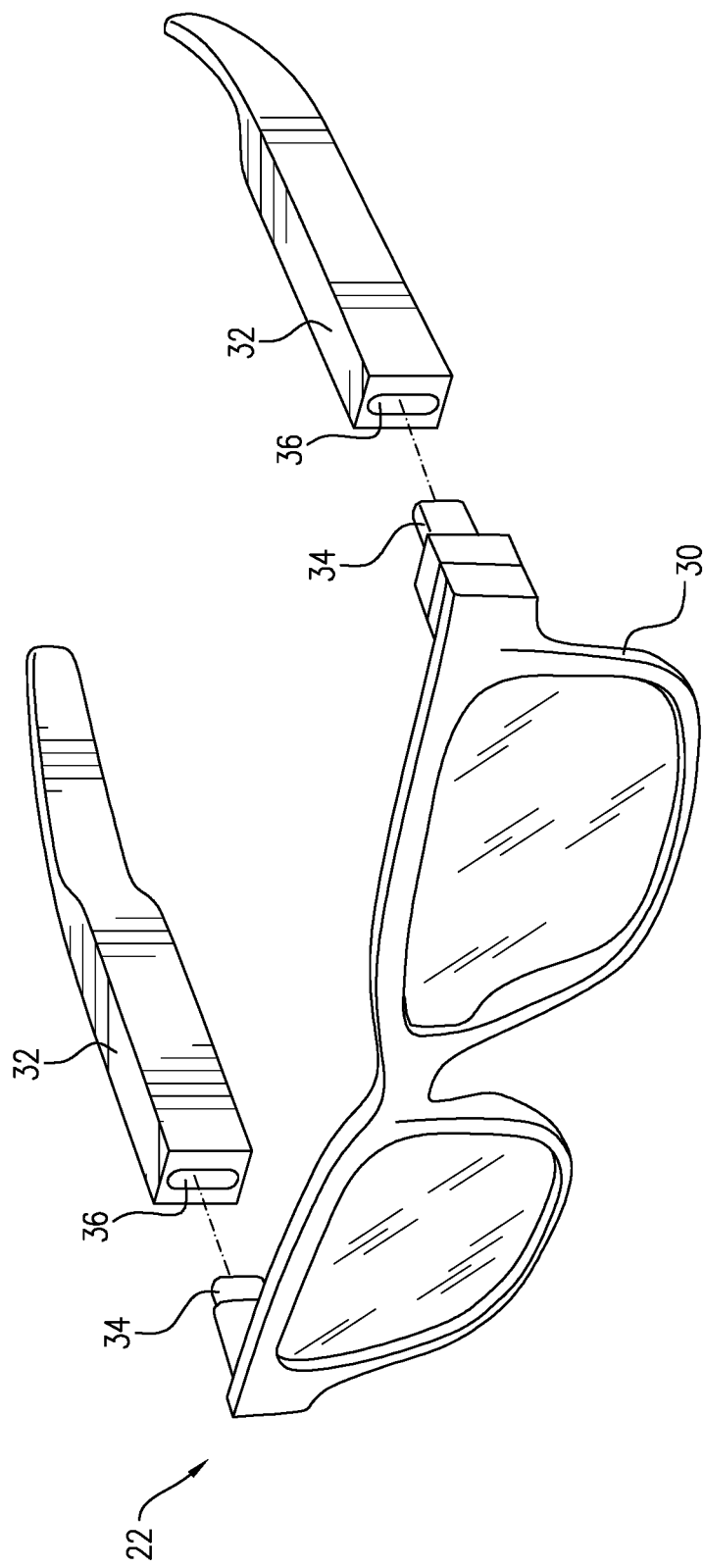
FIG. 2 is a schematic exploded view of a spectacle frame containing components of a hearing assistance device, in accordance with an embodiment of the invention.

FIG. 2 is a schematic exploded view of spectacle frame 22, in accordance with an embodiment of the invention. In this embodiment, connection terminals 34 at the left and right edges of front piece 30 mate with corresponding connection terminals 36 at the front ends of temples 32. Terminals 34 and 36 connect temples 32 mechanically to front piece 30 while completing an electrical circuit connection between microphones 23, 24, processing circuitry 26, and speaker 28 (FIG. 1). This feature is useful in allowing different temples 32, with different electronic and mechanical features, to be interchanged quickly and easily with different front pieces 30. In other embodiments, however, temples 32 are fixedly connected to front piece 30.

Different temples 32 can be interchanged, for example, to provide different sorts of hearing-assistance speakers for different users. Thus, the temples may be selected from a set of interchangeable temples that includes temples having speakers configured for insertion into the ear of the user and other temples having speakers positioned outside the ear of the user (as shown in FIG. 1). Other temples may have wired or wireless connections for earphones or user hearing aids. Additionally or alternatively, temples 32 and front pieces 30 may be provided in different styles and sizes. The use of interchangeable parts enables suppliers to offer hearing assistance devices with a wide ranges of functionalities while reducing manufacturing and inventory costs.

Signal Processing

Figure 3:
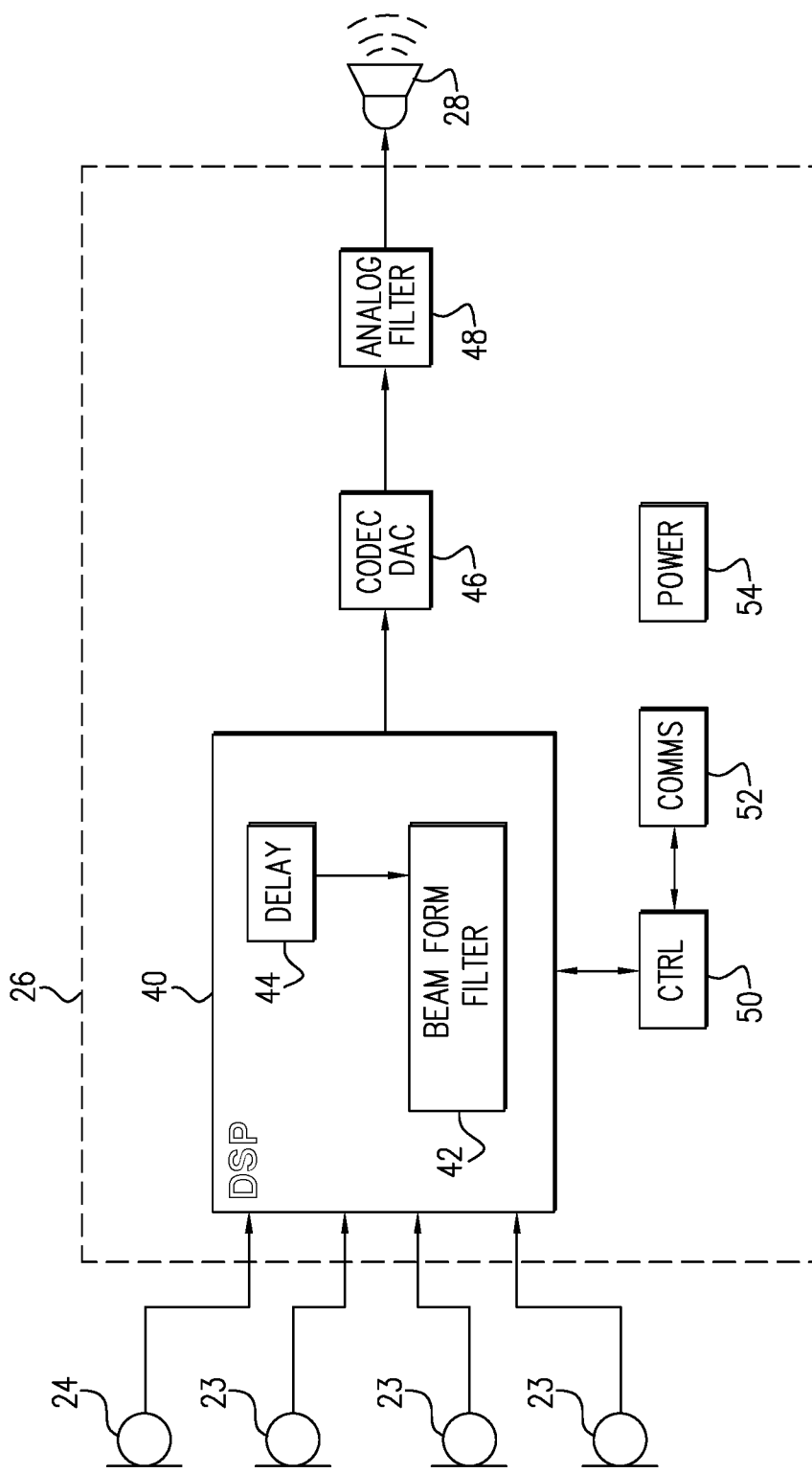
FIG. 3 is a block diagram that schematically shows details of a hearing assistance device, in accordance with an embodiment of the invention.

FIG. 3 is a block diagram that schematically shows details of processing circuitry 26 in a hearing assistance device, in accordance with an embodiment of the invention. Processing circuitry 26 can be implemented in a single integrated circuit chip or alternatively, the functions of processing circuitry 26 may be distributed among multiple chips, which may be located within or outside spectacle frame 22. Although one particular implementation is shown in FIG. 3, processing circuitry 26 may alternatively comprise any suitable combination of analog and digital hardware circuits, along with suitable interfaces for receiving the electrical signals output by microphones 23, 24 and outputting drive signals to speakers 28.

In the present embodiment, microphones 23, 24 comprise integral analog/digital converters, which output digital audio signals to processing circuitry 26. Alternatively, processing circuitry 26 may comprise an analog/digital converter for converting analog outputs of the microphones to digital form. Processing circuitry 26 typically comprises suitable programmable logic components 40, such as a digital signal processor (DSP) or a gate array, which implement the necessary filtering and mixing functions to generate and output a drive signal for speaker 28 in digital form. These filtering and mixing functions typically comprise application of a beamforming filter 42 with coefficients chosen in order to create the desired directional response. Alternatively or additionally, processing circuitry 26 may comprise a neural network (not shown), which is trained to determine and apply the coefficients to be used in filter 42. Further alternatively or additionally, processing circuitry 26 comprises a microprocessor, which is programmed in software or firmware to carry out at least some of the functions that are described herein.

Processing circuitry 26 may apply any suitable beamforming function that is known in the art, in either the time domain or the frequency domain, in mixing the signals that are output by microphones 23, 24. For example, a time delay algorithm may be used to combine the electrical signals from the microphones, with time shifts between the signals that are equal to the propagation times of the acoustic waves between the microphone locations with respect to the desired beam direction and to the location of speaker 28. Alternatively, a Minimum Variance Distortionless Response (MVDR) beamforming algorithm may be applied in order to achieve better spatial resolution. Other applicable beamforming techniques are based on Linear Constraint Minimum Variance (LCMV) and General Sidelobe Canceller (GSC) algorithms. Such beamforming algorithms, as well as other audio enhancement functions that can be applied by processing circuitry, are further described in the above-mentioned PCT International Publication WO 2017/158507 (particularly pages 10-11) and U.S. Pat. No. 10,567,888 (particularly in col. 9).

In some embodiments, as described in detail hereinbelow, processing circuitry 26 applies a selected delay 44, which may be fixed or variable, between the input and output of filter 42 for purposes of directional enhancement and/or suppression of audio feedback whistle.

An audio output circuit 46, for example comprising a suitable codec and digital/analog converter, converts the digital drive signal output from filter 42 to analog form. An analog filter 48 performs further filtering and analog amplification functions so as to optimize the analog drive signal to speaker 28. Alternatively or additionally, some or all of delay 44 may be implemented in analog filter 48.

A control circuit 50, such as an embedded microcontroller, controls the programmable functions and parameters of processing circuitry 26, possibly including delay 44. A communication interface 52, for example a Bluetooth® or other wireless interface, enables the user and/or an audiology professional to set and adjust these parameters as desired. A power circuit 54, such as a battery inserted into temple 32, provides electrical power to the other components of the processing circuitry.

Hearing Enhancement by Constructive Interference

Figure 4:
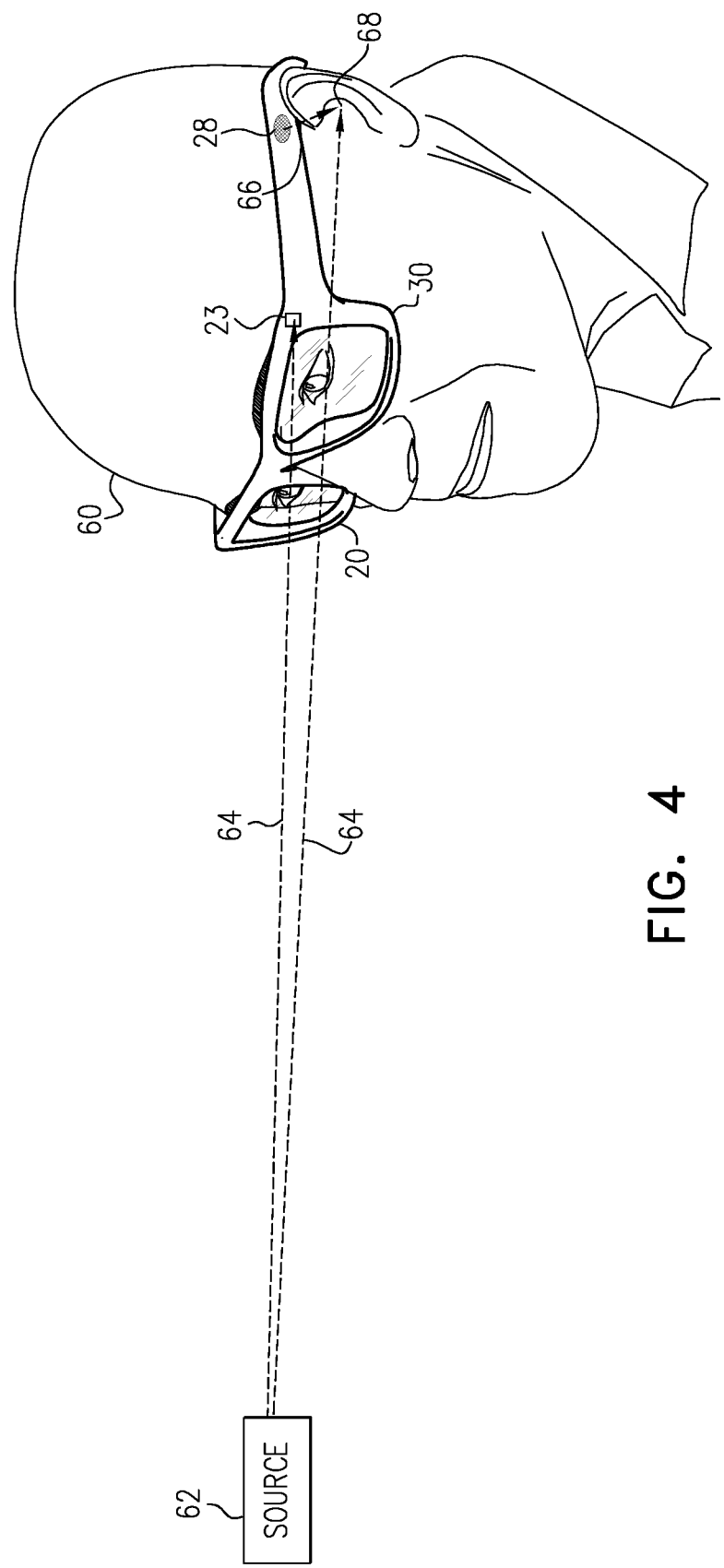
FIG. 4 is a schematic pictorial illustration showing an application of a hearing assistance device, in accordance with an embodiment of the invention.

FIG. 4 is a schematic pictorial illustration of an application of hearing assistance device 20 in use by a subject 60, in accordance with an embodiment of the invention. In this embodiment, as explained above, delay 44 (FIG. 3) is set so as to give a specified time offset between incidence of sounds that are emitted from a source 62 on front piece 30 and reproduction of the sounds by speaker 28. In other words, the delay is selected so that acoustic waves 66 that are output by speaker 28 reproduce selected sounds occurring in acoustic waves 64 that are received from source 62 by microphones 23 with a delay that is approximately equal to the transit time of the acoustic waves from front piece 30 to the location of speaker 28. The delay is chosen so as to engender constructive interference of the selected sounds between first and second acoustic waves 64, 66 at an ear 68 of subject 60. This interference in turn enhances the directional response of hearing assistance device 20. A certain amount of signal processing delay is inherent in filter 42, as well as in the operation of audio output circuit 46 and analog filter 48. Processing circuitry 26 applies additional delay as needed, in either the digital or the analog domain, in order to achieve the desired interference pattern.

The optimal delay for this purpose can be estimated by assuming that a one-dimensional sound source generates a traveling wave moving toward device 20 along the X-direction, which is taken to be perpendicular to the plane of front piece 30. The normalized acoustic pressure in this case can be written as:

$$p_{source} = \cos(\omega t - kx)$$

Here $\omega$ is the angular frequency, t is time, and k is the wave number. Using a free field approximation, the induced pressure by the source on microphone 23 and on the user's ear are given respectively by:

$$p_{source}^{Mic} = \cos(\omega t - k X_{Mic})$$

$$p_{source}^{Ear} = \cos(\omega t - k X_{Ear})$$

wherein $X_{Mic}$ and $X_{Ear}$ are the microphone and ear positions.

Taking speaker 28 to be an additional source of sound, the pressure at the ear that is induced by the speaker will be:

$$p_{Speaker}^{Ear} = A \cdot p_{source}^{Mic}(\Delta t)$$

Here A is the gain of the speaker output with respect to the pressure at microphone 23, and $\Delta t$ is the time delay induced by processing circuitry 26 (i.e., the time between receiving the pressure input at the microphone and the time the output pressure is transmitted by the speaker to the ear).

The total pressure in the ear is determined by the interference of the source and speaker pressures:

$$p^{Ear} = p_{Source}^{Ear} + p_{Speaker}^{Ear}$$
$$= \cos(\omega t - kX_{Ear}) + A \cdot p \cos(\omega(t + \Delta t) - k(-X_{Speaker} + X_{Ear} + X_{Mic}))$$

The condition for constructive interference in this case is as follows:

$$\Delta t = (X_{Mic} - X_{Speaker})\frac{k}{\omega} = (X_{Mic} - X_{Speaker})/c$$

wherein c the speed of sound. For a typical distance of 7 cm between microphone 23 and speaker 28, the optimal delay time of processing circuitry 26 for constructive interference is given by:

$$\Delta t = \frac{7 \, cm}{340 \, \frac{m}{sec}} = 206 \, \mu \sec$$

When the processing circuitry is set to apply this delay value, the gain of the sounds in the acoustic waves impinging on device 20 from the direction of interest (for example, from the direction of source 62) will increase due to the constructive interference, while the gain of the acoustic waves arriving from other directions will decrease due to partial or complete destructive interference. In order to improve the interference profile further, beyond the rough free-field approximation presented above, a frequency dependent transfer function, such as the head-related transfer function (HRTF), can be taken into account, in setting the delay. On this basis, with a single omni-directional microphone 23 positioned at the bridge of front piece 30, device 20 can achieve a directional enhancement of about 5 dB for sounds originating directly in front of frame 22, relative to sounds arriving from oblique angles. Using multiple microphones together with application of a suitable beamforming function by filter 42 gives even higher directional enhancement, for example up to 17 dB using an array of nine microphones with an MVDR beamformer.

In practice, the delay between the incidence of acoustic waves 64 on microphones 23 and the output of corresponding acoustic waves 66 from speakers 28 will vary depending on a number of factors, such as the dimensions of the user's head and the beamforming direction and condition. This variation in delay may amount to ±10% or even as much as ±20% relative to the transit time of the acoustic waves that was estimated above. In terms of this example, the delay may typically range between 150 µs and 250 µs. Processing circuitry 26 may adjust delay 44 dynamically, for example in order to optimize the directional response of device 20. The destructive interference between the incident acoustic waves and the acoustic waves output by speakers 28 in directions outside the desired angular range can also be useful in enhancing the directionality of the acoustic output from speakers 28, so that acoustic waves directed away from the user's ears are suppressed.

Suppression of Feedback Whistle

Additionally or alternatively, processing circuitry 26 modulates delay 44 over time in order to vary the resonant frequency of the audio feedback loop defined by filter 42 in amplifying and filtering the signals received from microphones 23, 24. As explained earlier, this modulation is useful in suppressing whistling in the output from speaker 28 due to acoustic feedback. This whistle suppression functionality may be implemented in conjunction with or independently of the beamforming techniques described above.

Feedback whistle will build up only if the whistle frequency has a wavelength that is an integer multiple of the length of the acoustic resonator that is created by filter 42 and the other elements of processing circuitry 26. The acoustic resonator length is equivalent in the time domain to the feedback latency of device 20, which is equal to the internal latency of processing circuitry plus the acoustic propagation time from speaker 28 to one of microphones 23, 24:

$$T_{Feedback\_Latency} = T_{HA\_Latency} + T_{AcousticPath}$$

Whistling may build up at resonant frequencies $F_n$, which produce standing waves inside the acoustic resonator:

$$F_n = (T_{Feedback\_Latency})^{-1} \cdot n \quad n=1,2,3,\ldots$$

For example, assuming that device has 5 ms internal latency and an acoustic path length of 0.14 ms between the speaker and microphone, the possible whistling frequencies include:

$$F_n \approx 195 \, [Hz] \cdot n = 195, 390, 585, 780, \ldots \, [Hz]$$

Modulating the internal latency of processing circuitry 26 reduces the buildup time available for whistling and thus suppresses the duration and amplitude of any whistles that may occur, because the resonant frequencies $F_n$ are continually changing. The most serious feedback problems occur at high frequencies, where the acoustic coupling and gain are more significant than at lower frequencies. The width of the resonant frequency bands $\Delta F$ is approximately equal to the frequency shift that will reduce the wave interference by 3 dB:

$$\Delta F \approx \frac{F_1}{3} = 65 \, Hz$$

Consequently, a small modulation of the processing latency in either the time or the frequency domain should be sufficient to suppress the high-order resonances.

For example, the latency modulation can be performed in the time domain by sampling the signals from microphones 23, 24 for input to filter 42 at a sequence of sampling intervals, and modifying the sampling intervals over time. This approach can be implemented with filter 42 configured as a FIR (finite impulse response) filter. Assuming the sampling frequency to be 16 kHz, a time sequence of FIR filters $\{FIR_m\}$ can be applied in order to generate the drive signal to speaker 28:

$$FIR_m = iFFT\left(\exp\left(i \cdot 2\pi \frac{m}{127} f\right)\right)$$

Each of these FIR filters time-shifts the signals by $$\frac{m}{127}$$

of a sample. The output frequency of hearing assistance device 20 is modulated slightly by successively applying $FIR_1, FIR_2, \ldots FIR_{127}$ and then $FIR_{127}, FIR_{126}, \ldots FIR_1$ to successive output samples. In this case, the output frequency will shift in steps of 126 Hz:

$$f_{output} = f_{sampling} \mp \frac{f_{sampling}}{127} = 16 \text{ kHz} \mp 126 \text{ Hz}$$

wherein the $\mp$ notation in this formula refers to the successive forward and backward frequency modulation paths.

The 126 Hz amplitude of the frequency modulation is larger than the estimated whistling frequency bandwidth, thus reducing the occurrence and duration of high frequency whistling. Alternatively, larger or smaller modulations of the sampling intervals may be applied, depending on the acoustic and electrical properties of the hearing assistance device.

In an alternative embodiment, processing circuitry 26 transforms the signals output by microphones 23, 24 to the frequency domain for input to filter 42 and modifies the frequency response of the filter over time in order to vary the resonant frequency. Other techniques for modulating the latency and resonant frequency of processing circuitry 26 may alternatively be applied for the present purposes, as will be apparent to those skilled in the art after reading the present disclosure. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for hearing assistance, comprising:
    a spectacle frame, comprising a front piece and temples connected to respective edges of the front piece;
    one or more microphones mounted at respective first locations on the front piece and configured to output electrical signals in response to first acoustic waves that are incident on the microphones;
    a speaker mounted at a second location on one of the temples and configured to output second acoustic waves in response to a drive signal applied to the speaker; and
    processing circuitry, which is configured to generate the drive signal by processing the electrical signals output by the one or more microphones so as to cause the speaker to reproduce, in the second acoustic waves, selected sounds occurring in the first acoustic waves with a delay, relative to an incidence of the first acoustic waves on the one or more microphones, that is equal within 20% to a transit time of the first acoustic waves from the first location to the second location, thereby engendering constructive interference of the selected sounds between the first and second acoustic waves,
    wherein the processing circuitry is configured to adjust the delay of the selected sounds reproduced in the second acoustic waves relative to the first acoustic waves from the first location to the second location, and
    wherein the delay is selected so as to apply the constructive interference to the first acoustic waves that are incident on the one or more microphones from within a selected angular range while applying destructive interference to the first acoustic waves that are incident on the one or more microphones from directions outside the selected angular range.

2. The apparatus according to claim 1, wherein the delay of the selected sounds reproduced in the second acoustic waves is equal to within 10% to the transit time of the first acoustic waves from the first location to the second location.

3. The apparatus according to claim 1, wherein the delay of the selected sounds reproduced in the second acoustic waves relative to the incidence the first acoustic waves on the one or more microphones is between 150 µs and 250 µs.

4. The apparatus according to claim 1, wherein the one or more microphones comprise multiple microphones arrayed across the front piece, and wherein the processing circuitry is configured to apply a beamforming function to the electrical signals output by the multiple microphones so as to emphasize the selected sounds that originate within the selected angular range while suppressing background sounds originating outside the selected angular range.

5. The apparatus according to claim 1, wherein the processing circuitry is configured to filter the electrical signals using a digital filter, which defines an audio feedback loop having a resonant frequency, so as to generate the drive signal for input to the speaker, and to vary the resonant frequency continually while amplifying and filtering the electrical signals.

6. The apparatus according to claim 1, and comprising:
    first connection terminals fixed respectively to left and right edges of the front piece; and
    second connection terminals fixed at respective front ends of the temples and configured to mate with the first connection terminals so as to connect the temples mechanically to the front piece while completing an electrical circuit connection between the one or more microphones, the processing circuitry, and the speaker.

7. Apparatus for hearing assistance, comprising:
    one or more microphones, which are configured be mounted in proximity to a head of a subject and to output electrical signals in response to first acoustic waves that are incident on the microphones;
    a speaker, which is configured for mounting in proximity to an ear of the subject; and
    processing circuitry, which is configured to amplify and filter the electrical signals so as to generate a drive signal for input to the speaker, using a digital filter that defines, together with the one or more microphones and the speaker, an audio feedback loop having a resonant frequency, and to vary the resonant frequency continually while amplifying and filtering the electrical signals,
    wherein the digital filter has a temporal latency, which determines the resonant frequency, and the processing circuitry is configured to modulate the temporal latency in order to vary the resonant frequency.

8. The apparatus according to claim 7, wherein the processing circuitry is configured to sample the electrical signals for input to the digital filter at a sequence of sampling intervals and to modulate the temporal latency of the digital filter by modifying the sampling intervals.

9. The apparatus according to claim 7, wherein the processing circuitry is configured to transform the electrical signals to a frequency domain for input to the digital filter and to modify a frequency response of the digital filter in order to vary the resonant frequency.

10. The apparatus according to claim 7, wherein the one or more microphones comprise an array of multiple microphones, and wherein the processing circuitry is configured to apply a beamforming function to the electrical signals output by the multiple microphones so as to emphasize in the drive signal sounds that originate within a selected angular range while suppressing background sounds originating outside the selected angular range.

11. The apparatus according to claim 7, and comprising a spectacle frame, wherein the one or more microphones are mounted at respective locations on the spectacle frame.

12. The apparatus according to claim 11, wherein the spectacle frame comprises a front piece and temples, and wherein the apparatus further comprises first connection terminals fixed respectively to left and right edges of the front piece, and second connection terminals fixed at respective front ends of the temples and configured to mate with the first connection terminals so as to connect the temples mechanically to the front piece while completing an electrical circuit connection between the one or more microphones, the processing circuitry, and the speaker.

13. Apparatus for hearing assistance, comprising:
a spectacle frame, comprising a front piece and temples;
multiple microphones arrayed at respective first locations across the front piece and configured to output electrical signals in response to first acoustic waves that are incident on the microphones;
a speaker mounted at a second location on at least one of the temples and configured to output second acoustic waves in response to a drive signal applied to the speaker;
processing circuitry, which is mounted on the spectacle frame and is configured to process the electrical signals so as to generate the drive signal;
first connection terminals fixed respectively to left and right edges of the front piece; and
second connection terminals fixed at respective front ends of the temples and configured to mate with the first connection terminals SO as to connect the temples mechanically to the front piece while completing an electrical circuit connection between the one or more microphones, the processing circuitry, and the speaker,
wherein the processing circuitry is configured to apply a beamforming function to the electrical signals output by the multiple microphones so as to emphasize in the drive signal sounds that originate within a selected angular range while suppressing background sounds originating outside the selected angular range.

14. Apparatus for hearing assistance, comprising:
a spectacle frame, comprising a front piece and temples;
one or more microphones mounted at respective first locations on the front piece and configured to output electrical signals in response to first acoustic waves that are incident on the microphones;
a speaker mounted at a second location on at least one of the temples and configured to output second acoustic waves in response to a drive signal applied to the speaker;
processing circuitry, which is mounted on the spectacle frame and is configured to process the electrical signals so as to generate the drive signal;
first connection terminals fixed respectively to left and right edges of the front piece; and
second connection terminals fixed at respective front ends of the temples and configured to mate with the first connection terminals so as to connect the temples mechanically to the front piece while completing an electrical circuit connection between the one or more microphones, the processing circuitry, and the speaker,
wherein the temples are selected from a set of interchangeable temples, including first temples having first speakers configured for insertion into an ear of a user of the apparatus and second temples having second speakers configured to be positioned outside the ear of the user.

15. A method for hearing assistance, comprising:
mounting on a front piece of a spectacle frame one or more microphones, which output electrical signals in response to first acoustic waves that are incident on the microphones;
mounting on at least one of the temples of the spectacle frame, which are connected to respective edges of the front piece, a speaker, which outputs second acoustic waves in response to a drive signal applied to the speaker; and
generating the drive signal by processing the electrical signals output by the one or more microphones so as to cause the speaker to reproduce, in the second acoustic waves, selected sounds occurring in the first acoustic waves with a delay, relative to an incidence of the first acoustic waves on the one or more microphones, that is equal within 20% to a transit time of the first acoustic waves from the first location to the second location, thereby engendering constructive interference of the selected sounds between the first and second acoustic waves,
wherein processing the electrical signals comprises adjusting the delay of the selected sounds reproduced in the second acoustic waves relative to the first acoustic waves from the first location to the second location so as to engender the constructive interference, and
wherein the delay is selected so as to apply the constructive interference to the first acoustic waves that are incident on the one or more microphones from within a selected angular range while applying destructive interference to the first acoustic waves that are incident on the one or more microphones from directions outside the selected angular range.

16. The method according to claim 15, wherein the delay of the selected sounds reproduced in the second acoustic waves is equal to within 10% to the transit time of the first acoustic waves from the first location to the second location.

17. The method according to claim 15, wherein the delay of the selected sounds reproduced in the second acoustic waves relative to the incidence the first acoustic waves on the one or more microphones is between 150 μs and 250 μs.

18. The method according to claim 15, wherein mounting the one or more microphones comprises arraying multiple microphones across the front piece, and wherein processing the electrical signals comprises applying a beamforming function to the electrical signals output by the multiple microphones so as to emphasize the selected sounds that originate within the selected angular range while suppressing background sounds originating outside the selected angular range.

19. The method according to claim 15, wherein processing the electrical signals comprises filtering the electrical signals using a digital filter, which defines an audio feedback loop having a resonant frequency, so as to generate the drive signal for input to the speaker, and to vary the resonant frequency continually while amplifying and filtering the electrical signals.

20. A method for hearing assistance, comprising:
mounting in proximity to a head of a subject one or more microphones, which output electrical signals in response to first acoustic waves that are incident on the microphones;
mounting a speaker in proximity to an ear of the subject;
amplifying and filtering the electrical signals so as to generate a drive signal for input to the speaker, using a digital filter that defines, together with the one or more microphones and the speaker, an audio feedback loop having a resonant frequency; and
varying the resonant frequency continually while amplifying and filtering the electrical signals,
wherein the digital filter has a temporal latency, which determines the resonant frequency, and varying the resonant frequency comprises modulating the temporal latency.

21. The method according to claim 20, wherein filtering the electrical signals comprises sampling the electrical signals for input to the digital filter at a sequence of sampling intervals and modifying the sampling intervals in order to modulate the temporal latency of the digital filter.

22. The method according to claim 20, wherein filtering the electrical signals comprises transforming the electrical signals to a frequency domain for input to the digital filter and modifying a frequency response of the digital filter in order to vary the resonant frequency.

23. The method according to claim 20, wherein the one or more microphones comprise an array of multiple microphones, and wherein amplifying and filtering the electrical signals comprises applying a beamforming function to the electrical signals output by the multiple microphones so as to emphasize in the drive signal sounds that originate within a selected angular range while suppressing background sounds originating outside the selected angular range.

24. The method according to claim 20, wherein the one or more microphones are mounted at respective locations on a spectacle frame.

* * * * *